United States Patent [19]

Fujita et al.

[11] 4,212,891

[45] Jul. 15, 1980

[54] METHOD AND APPARATUS FOR STORING FOODSTUFFS

[75] Inventors: Yuko Fujita; Hisashi Kudo, both of Kyoto, Japan

[73] Assignee: Japan Storage Battery Company Limited, Kyoto, Japan

[21] Appl. No.: 932,075

[22] Filed: Aug. 8, 1978

[30] Foreign Application Priority Data

Sep. 13, 1977 [JP] Japan .................................. 52/110651
Sep. 14, 1977 [JP] Japan .................................. 52/110945
Nov. 22, 1977 [JP] Japan .................................. 52/140356

[51] Int. Cl.$^2$ ............................................. A01K 43/00
[52] U.S. Cl. ........................................ 426/231; 422/2; 422/3; 422/40; 422/108; 422/111; 422/117; 426/418
[58] Field of Search ............... 426/416, 418, 419, 231; 422/3, 22, 40, 2, 108, 110, 111, 117; 204/129, 130

[56] References Cited

U.S. PATENT DOCUMENTS

| | | | |
|---|---|---|---|
| 3,365,307 | 1/1968 | Dixon ................................. | 426/231 |
| 3,400,054 | 9/1968 | Ruka et al. ........................... | 204/130 |
| 3,410,783 | 11/1968 | Tomter ................................ | 204/129 |
| 3,937,847 | 2/1976 | Elkins et al. ......................... | 426/416 |
| 4,024,036 | 5/1977 | Nakamura et al. ................. | 204/129 |

*Primary Examiner*—S. Leon Bashore
*Assistant Examiner*—Peter Chin
*Attorney, Agent, or Firm*—Sughrue, Rothwell, Mion, Zinn and Macpeak

[57] ABSTRACT

A method of storing foodstuffs and an apparatus for practicing the same, in which an electrolytic cell includes a gas diffusion cathode capable of reducing oxygen electrolytically and an oxygen liberating anode, and a DC voltage is applied to the electrolytic cell while the gas in a food storage chamber is brought into contact with the cathode to remove oxygen from the storage chamber, whereby the oxygen concentration in the storage chamber is controlled to a desired value.

6 Claims, 8 Drawing Figures

METHOD AND APPARATUS FOR STORING FOODSTUFFS

BACKGROUND OF THE INVENTION

This invention relates to methods of storing foodstuffs and apparatuses for practicing the same, and more particularly to a method of storing foods and an apparatus for practicing the same in which an electrochemical oxygen removal device including a gas diffusion electrode capable of selectively reducing oxygen in the air electrolytically employed to control the oxygen concentration in a food storage chamber to a desired value, to thereby prevent the deterioration of the quality, especially the freshness, of a food due to its breathing.

It is well known in the art that a method of cold storage or refrigeration is employed for storing or preserving foods. Furthermore, it is also well known that in the case where these methods are insufficient for storing foods, a so-called "controlled atmosphere (CA) storing method" is employed in which the environmental conditions of the food such as the temperature, humidity, oxygen concentration, carbon dioxide concentration, etc. in the storage chamber are controlled.

During the storage, foods, especially fruits or vegetables, breathe the oxygen in the storage chamber, to produce carbon dioxide and water while their freshness is degraded. If in this case the aforementioned CA storage method is employed, the oxygen concentration in the storage chamber can be maintained low. Therefore, the foods' breathing is suppressed, as a result of which the freshness is maintained for a long period of time.

With respect to the CA storage technique, a natural CA method and a mechanical CA method, or a flush type CA method, have been employed.

In the former method, a controlled atmosphere state in the storage chamber is obtained by the respiration of the food itself stored therein. In other words, if foods are stored in an extremely gastight refrigerator, the level of oxygen in the refrigerator is gradually reduced by the respiration of the foods while the level of carbon dioxide is gradually increased, as a result of which the respiration of the foods becomes gradually inactive. The advantage of this method lies in that no auxiliary means for controlling the oxygen concentration is provided, and therefore the cost for installation and operation of such an auxiliary means is zero. However, the method is still disadvantageous in that the fabricating cost of the refrigerator is very high because the airtightness of it must be very good, and it takes a long period of time (20 to 30 days) until the oxygen concentration reaches the required value, during which the foods are degraded in quality and, therefore, it is not permissible to open the door of the refrigerator for investigation and partial shipment of foods.

On the other hand, in the latter method, that is, the mechanical CA method or the flush CA method, a gas mixture low in oxygen concentration and containing carbon dioxide, which is obtained by burning a fuel mixture such as propane gas or natural gas and the air, is flushed into the refrigerator. This method is disclosed, for instance, by a publication "Food Engineering" 45(6), pages 318-319, (1964). The advantage of the method lies in that the period of time required for decreasing the oxygen concentration in the refrigerator is merely one to three days which is shorter than that in the case of the natural CA method described above, and that even a refrigerator poor in gastightness can be used. However, this method has various disadvantages. The device for providing the low oxygen concentration is considerably bulky, and intricate in construction and, therefore, it is expensive. Furthermore, as the mixture of gases is burned at high temperature, its burner's service life is relatively short. It is difficult to operate the device intermittently and to control the oxygen concentration with high accuracy. In addition, poisonous gases may be produced because of incomplete combustion.

SUMMARY OF THE INVENTION

Accordingly, an object of this invention is to eliminate all the drawbacks accompanying the conventional CA storage method by providing a method in which by utilizing an electrolytic cell including a gas diffusion cathode and an oxygen evolution anode, the oxygen concentration in a foods storage chamber is controlled to a value lower than that of the air, and an apparatus for practicing the method.

The method according to the invention is advantageous in that the apparatus for practicing the method is simple in construction, it is possible to reduce the oxygen concentration to 0%, only a short time is required until the oxygen concentration reaches a desired value and, after the desired oxygen concentration is obtained once, the oxygen concentration can be automatically maintained with a very small electric power.

Briefly, an eletrolytic cell is used to remove oxygen from the storeroom atmosphere and additional air is supplied to the storeroom whenever the pressure and/or oxygen concentration in the storeroom drop below desired levels. An oxygen sensor may be used to control the operation of the cell and external air supply or one or more openings may be provided having a total size corresponding to the volume of the storeroom, capacity of the cell and desired oxygen concentration so that air is admitted to the storeroom at a predetermined rate necessary to maintain the desired oxygen concentration.

One of the specific features of this invention lies in that an electrochemical oxygen removal device including a gas diffusion electrode is employed for controlling the oxygen concentration in a storage chamber.

A method of electrochemically separating oxygen from air is disclosed by Japanese Patent Publication No. 25001/1968 (corresponding to U. S. patent application Ser. No. 289,281) or U.S. Pat. No. 3,347,759 (corresponding to German patent application No. S87,775). However, it has been heretofore unknown to use such oxygen removal methods for food storage in the manner described herein.

BRIEF DESCRIPTION OF THE DRAWINGS

The novel features which are considered characteristic of this invention are set forth in the appended claims. This invention itself, however, as well as other objects and advantages thereof will be best understood by reference to the following detailed description when read in conjunction with the accompanying drawings.

In the accompanying drawings.

DETAILED DESCRIPTION OF THE INVENTION

Figure 1:
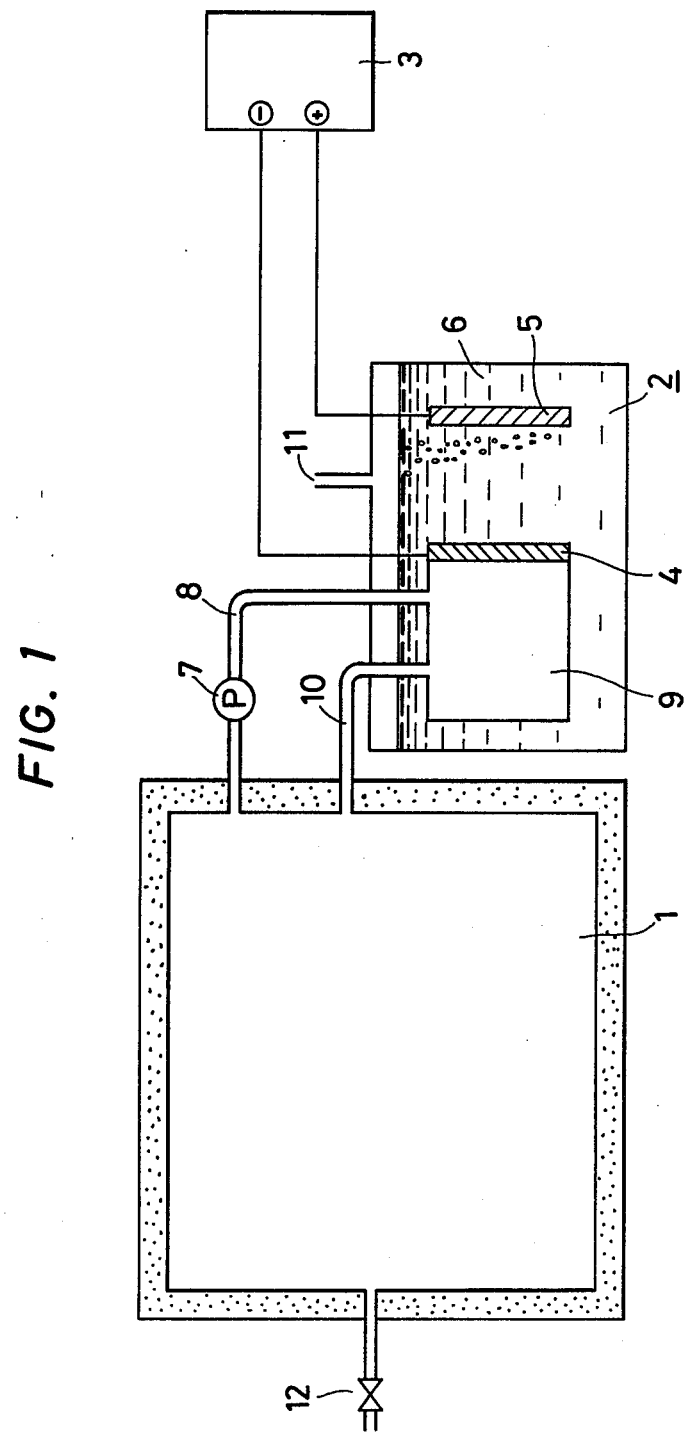
FIG. 1 is a schematic diagram for a description of the principle of electrochemically removing the oxygen from food storage chamber.

First of all, a method of electrochemically removing oxygen from air will be described as conducive to a full understanding of this invention.

In this method, an electrolytic cell comprising a cathode which is a gas diffusion electrode and which is capable of selectively reducing oxygen electrolytically as is well known in the art of fuel cells, an anode which is electrochemically inactive and an electrolyte or an ion exchange membrane is provided. When an external potential is applied to this electrolytic cell while the air is brought into contact with the cathode, then in the case where an alkaline electrolyte is employed the following reaction may occur:

Cathode: $O_2 + 2H_2O + 4e^- \rightarrow 4OH^-$

Anode: $4OH^- \rightarrow O_2 \uparrow + 2H_2O + 4e^-$

In the case where an acid electrolyte or a cation exchange membrane is employed, the following reaction occurs:

Cathode: $O_2 + 4H^+ + 4e^- \rightarrow 2H_2O$

Anode: $2H_2O \rightarrow 4H^+ + O_2 \uparrow + 4e^-$

With any electrolyte, oxygen is consumed at the cathode, and is liberated at the anode. In other words, out of the air brought into contact with the cathode, only the oxygen is transported to the anode. Accordingly, it can be said that such an electrolytic cell as described above is a kind of oxygen pump. Therefore, if a gas left as a result of the oxygen removal at the gas side of the cathode is utilized, then the electrolytic cell can be regarded as an oxygen removing device. If it is intended to use the oxygen liberated at the anode, the electrolytic cell can be regarded as an oxygen generating device.

In this invention, the above-described electrolytic cell having a function as the oxygen removing device is utilized for a food storage chamber. By application of such an electrochemical oxygen removal device to a food storage chamber, the following merits can be obtained when compared with the conventional mechanical CA storage method:

(1) As only the oxygen from the gas mixture in the storage chamber is selectively removed, the oxygen concentration in the storage chamber is effectively decreased in a very short period of time.

(2) The oxygen in the storage chamber is removed merely by applying a DC current to the electrolytic cell and the amount of oxygen removed is completely proportional to the quantity of electricity applied thereto. Therefore, the operation is very simple, and in addition, the construction of an apparatus for completely automatically controlling the oxygen concentration is also considerably simple.

(3) Since the apparatus is operated at room temperature, it is very safe and is substantially free of troubles.

(4) The number of auxiliary parts such as pipes, cocks, flow control valves, etc. are very small and, therefore, the apparatus is simple in construction, high in reliability, and is very little trouble.

(5) No poisonous gases such as for instance carbon monoxide are produced.

The application of an electrochemical oxygen removal device to a food storage chamber has never been proposed and there have been special problems to be solved in the structural relationships between the storage chamber and the electrolytic cell and in the electrolytic cell operating procedure.

The present invention which solves these problems will now be described in detail.

Referring to FIG. 1, reference numeral 1 designates a storage chamber for storing foods, reference numeral 2 designates an electrolytic cell and reference numeral 3 designates a DC power supply.

It is preferable that the storage chamber 1 is provided with a refrigerator and humidist at which are not shown in FIG. 1.

The electrolytic cell 2 is made up of a gas difusion electrode 4 which is capable of selectively reducing oxygen electrochemically, an oxygen evolution electrode 5 made of nickel expanded metal and electrolyte 6 of 30% KOH aqueous solution. The gas diffusion electrode 4 is employed as a cathode, while the oxygen evolution electrode 5 is employed as an anode.

The air in the storage chamber 1 is introduced through a pipe 8 into a gas chamber 9 by means of an air pump 7 and is returned to the storage chamber 1 through a pipe 10. If, under the condition that air, or more strictly speaking oxygen, exists in the gas chamber 9, a DC voltage is applied between the gas diffusion electrode 4 and the oxygen evolution electrode 5 by means of the power supply 3, only the oxygen in the chamber 9 is subjected to electrolytic reduction, as a result of which hydroxyl ion (OH$^-$) is formed. The hydroxyl ion is subjected to electrolytic oxidation at the anode, and oxygen gas is liberated. The oxygen gas thus liberated at the anode is purged through an oxygen outlet 11 out of the electrolytic cell 2. Thus, only the oxygen in the gas chamber 9 and accordingly in the storage chamber 1 can be removed.

Upon removal of the oxygen, the pressure in the storage chamber 1 becomes negative. In order to prevent this, a negative-pressure control valve 12 which is normally closed but is opened when the pressure in the storage chamber 1 becomes negative is provided for the storage chamber 1.

The amount of oxygen removed from the electrolytic cell 2 is proportional to the charge applied thereto, and it is approximately 210 cc per Ah at 0° C. under one atmospheric pressure. Therefore, the larger the current applied to the electrolytic cell, the higher the speed at which the oxygen is removed. However, application of excessively large current should be avoided, because if excessively large current is applied to the electrolytic cell oxygen is not reduced at the cathode, but hydrogen is evolved, which leads to shortening the service life of the gas diffusion electrode. Accordingly, the value of current to be applied to the electrolytic cell should be suitably selected according to the current-voltage characteristic of the electrolytic cell.

Figure 2:
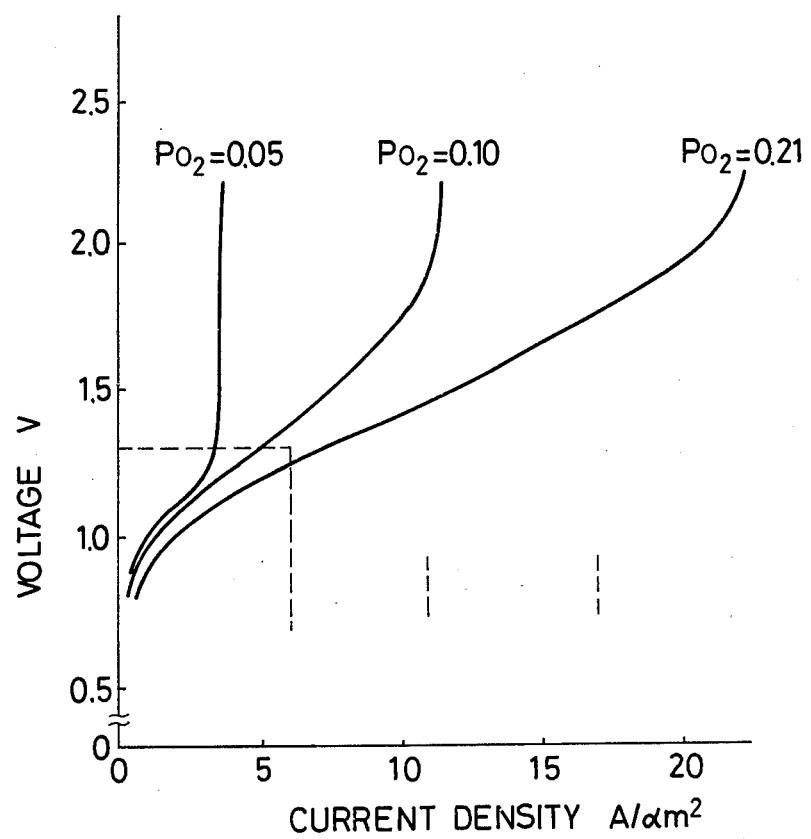
FIG. 2 is a graphical representation indicating the current-voltage characteristic of an electrolytic cell.

In general, the current-voltage characteristic of the electrolytic cell depends on the concentration of oxygen in the gas mixture permitted contact with the gas diffusion electrode, as indicated in FIG. 2. In the graphical representation indicated in FIG. 2, there is limiting current density for every oxygen concentration, at which the current is maintained at a certain value even if the voltage is increased.

The limiting current density is increased as the oxygen concentration is increased. If current exceeding the limiting current density is allowed to flow, the voltage of the electrolytic cell is abruptly increased, and finally it reaches a voltage (about 2.2 volts) at which hydrogen is evolved at the cathode. Accordingly, a suitable current density is lower than the limiting current density, and is dependent on oxygen concentration.

In practice, however, it is not preferable to finely control the current density in accordance with the oxygen concentration, because such control results in the necessity of a more intricate DC power supply and an increase in manufacturing cost.

Simplification of the power supply may be effectively accomplished by controlling the current or the voltage as indicated by the broken line in FIG. 2. That is, a constant current is allowed to flow through the electrolytic cell in a region where the oxygen concentration is relatively high, while a constant voltage is applied in a region where the oxygen concentration is relatively low. This method of operating the electrolytic cell is one of the important features of this invention.

Since the current-voltage characteristic of the electrolytic cell gradually changes, during a long operating time, it is desirable that the value of current allowed to flow through the electrolytic cell or the value of voltage applied thereto is suitably selected according to the change of the current-voltage characteristic.

The construction of the electrolytic cell $\underline{2}$ shown in FIG. 1 is merely to be taken as a conceptual figure. In practice, the electrolytic cell is made up of a number of single electrolytic cells arranged in series or in parallel as described later. The method of arranging the unitary electrolytic cells is to be determined in accordance with both the internal volume of the storage chamber and a desired period of time required for removing the oxygen from the storage chamber.

The electrolytic cell $\underline{2}$ is set outside the storage chamber 1 in FIG. 1; however, it may be put inside the storage chamber 1.

When DC current is applied to the stack electrolytic cell consisting of a number of unitary electrolytic cells, the following problems, or difficulties may be encountered.

During the earlier operation time period, individual unitary electrolytic cells may be equal to one another in current-voltage characteristic; however, the current-voltage characteristics of the unitary electrolytic cells often become different from one another in a long operating period. Even if, in this case, the total voltage applied to the cells is so selected that the mean voltage of the voltages of the unitary electrolytic cells does not reach a voltage at which hydrogen gas evolves, the voltages of the unitary electrolytic cells are different from one another, and sometimes a hydrogen evolution voltage may be applied to some of the unitary electrolytic cells carelessly.

It goes without saying that evolution of a hydrogen gas must be avoided because if it is mixed with oxygen gas in the electrolytic cell, an explosion may result.

Solution of such a problem will be accomplished by employing a hydrogen gas sensor connected to the oxygen outlet, and immediately turning off the power supply switch when hydrogen gas is detected thereby. Alternatively, a voltage of each unitary electrolytic cell may be measured and the switch turned off immediately when the hydrogen gas evolution voltage or a voltage slightly lower than that is detected.

In this latter case, it is most desirable to check the voltage of each unitary electrolytic cell; however, the danger of explosion can be avoided also by checking a voltage of a suitable number of unitary electrolytic cells instead of each cell. It is desirable that the power switch turning-off operation is carried out automatically.

The lowering of the current-voltage characteristic of the electrolytic cell attributes to not only the electrode service life but also decreases of the electrolyte-electrode contact area. The electrolyte or the water therein may escape out of the electrolytic cell due to bubbling of oxygen or by evaporation through pores of the gas diffusion electrode, as a result of which the level of electrolyte drops. Furthermore, the electrolyte sometimes may be leadked out of the cell for some reason. As the electrolyte level is lowered, the actual working area of the electrodes is decreased. As a result, the voltage of the electrolytic cell is increased until finally it reaches the hydrogen gas evolution voltage. Thus, checking the voltage of the electrolytic cells can prevent the abnormal voltage rise which is caused by the lowering of the electrolyte level.

However, it is essential to prevent the lowering of the electrolyte level before the abnormal voltage rise occurs. For this purpose, a water supplying device which, as the electrolyte level is lowered automatically supplies water to the electrolytic cell, may be employed in accordance with a conventional method well known in the field of ordinary batteries.

In storing foods, the optimum value of oxygen concentration in the storage chamber depends on the kinds of foods, varying in a range of 0 to 10%.

If, when the aimed oxygen concentration is obtained by removing the oxygen gas, the operation of the electrolytic cell is suspended, a desired oxygen concentration can be obtained in accordance with the procedure of this invention.

However, even if the oxygen concentration reaches the aimed level once, sometimes it may become lower than that level with the lapse of time because the food breathes in the storage chamber. In this case, fresh air is supplied into the storage chamber with a suitable blower preferably automatically in accordance with the following method.

Figure 3:
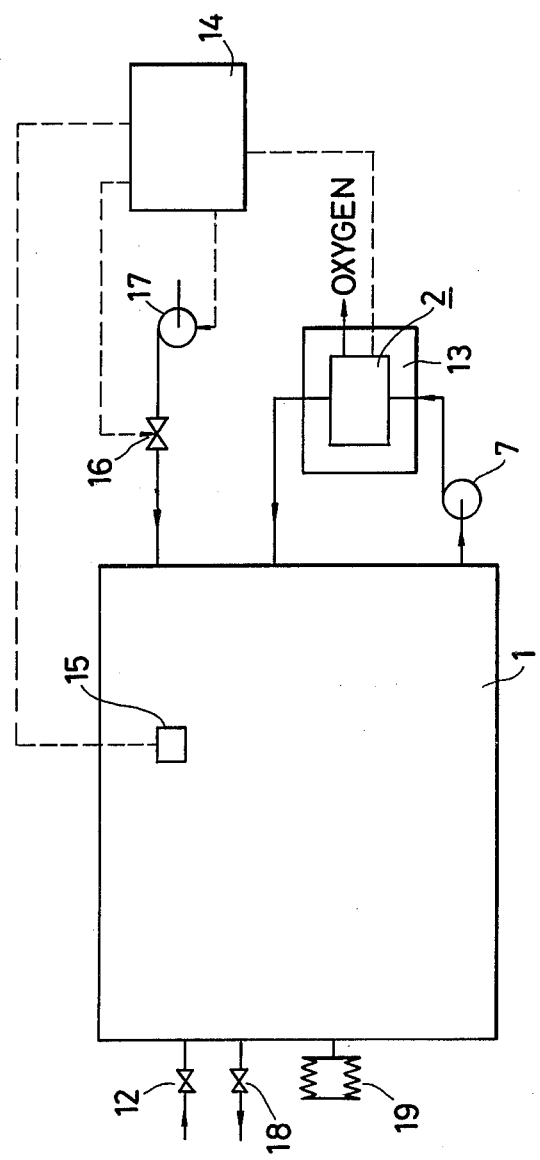
FIG. 3 is an explanatory diagram illustrating a system for controlling the oxygen concentration in a food storage chamber.

FIG. 3 is a block diagram illustrating an oxygen concentration control system. Referring to FIG. 3, reference numeral 1 designates a storage chamber; $\underline{2}$, an electrolytic cell for removing oxygen; 13, an electrolytic cell accommodating chamber for accommodating the electrolytic cell $\underline{2}$; and 7, a blower for introducing the gas in the storage chamber 1 into the electrolytic cell accommodating chamber. The blower 7 may be installed in the chamber 13.

A controller 14 operates as follows: On the basis of a signal outputted from an oxygen concentraton sensor 15 set in the storage chamber, when the oxygen concentration in the storage chamber 1 is higher than an aimed value, the controller 14 operates to apply a DC voltage to the electrolytic cell 2; while when lower, it operates to open a solenoid valve 16 and to operate an air pump 17, to thereby supply fresh air to the storage chamber 1.

The oxygen concentration sensor 15 may be of a lead-oxygen cell system (or diaphragm galvanic system), a probe system employing a modified polarography means, or an oxygen concentration cell employing a stabilized zirconia solid electrolyte, which is available on the market.

An excessive pressure control valve 18 is a relief valve which is opened to purge the gas out of the storage chamber when the pressure of the gas in the storage chamber 1 becomes higher than the atmospheric pressure as a result of the introduction of air into the storage chamber by means of the air pump 17.

An ordinary temperature control device and a humidity control device (not shown) are provided for the storage chamber 1, so that the temperature and the humidity in the storage chamber 1 are maintained at suitable and constant values depending on the kind of food stored therein. Even if it is attempted to maintain a constant temperature, it is, in general, varied within a certain range of, for instance, ±1° C. Furthermore, in general, the temperature variation occurs with a period of 1-10 minutes. As the temperature is changed frequently in this way, the pressure in the storage chamber is also changed with the same period in accordance with expansion or contraction of the gas. As a result, when the temperature is increased, the excessive pressure control valve 18 is opened depending on its set operating pressure value and, therefore, the gas in the storage chamber whose oxygen concentration is lower than that of the air is purged out of the storage chamber 1. In contrast, when the temperature is decreased, the negative pressure control valve 12 is opened and, therefore, air relatively higher in oxygen concentration is introduced into the storage chamber 1. As a result, the oxygen concentration in the storage chamber 1 cannot be reduced to the aimed value. Provided for eliminating such a difficulty as described above is a pressure compensating device 19. The pressure compensating device is a means such as a bellows made of rubber for instance, which can expand and contract freely. The pressure compensating device 19 is so designed that its expansion and contraction are effected at a pressure which is lower than the operating pressures of the excessive pressure control valve 18 and the negative pressure control valve 12. More specifically, a method is employed in which the maximum internal volume of the bellows of the pressure compensating device 19 is set to the sum of variations in volume which are caused by expansion and contraction of the gas in storage chamber 1, the sum corresponding to the maximum control range of the temperature control device provided for the storage chamber 1. When the temperature in the storage chamber 1 becomes higher than a predetermined value to fully expand the bellows of the pressure compensating device 19, the excessive pressure control valve 18 is operated to release the excessive gas out of the storage chamber 1 and when the temperature becomes lower than the predetermined value to fully contract the bellows, the negative pressure control valve 12 is operated to introduce air into the storage chamber 1.

By the employment of this method, under the condition that the temperature is controlled, the gas in the storage chamber 1 is purged only when the air pump 17 is operated to introduce air into the chamber, the oxygen removal is effected by means of the electrolytic cell 2. Thus, at least the problem caused when the gas is purged out of the storage chamber 1 and the air is allowed to enter the storage chamber 1 wherein the temperature is changed, can be eliminated and, therefore, the oxygen removal can be quickly effected to the predetermined oxygen concentration.

The configuration of the bellows of the pressure compensating device is to be taken as nonlimitative. That is, all that is necessary for the bellows is that it can expand and contract in response to a relatively small pressure variation. Furthermore, the oxygen concentration sensor and the pressure control devices shown in FIG. 3 may be coupled to the electrolytic cell accommodating chamber 13.

Figure 4:
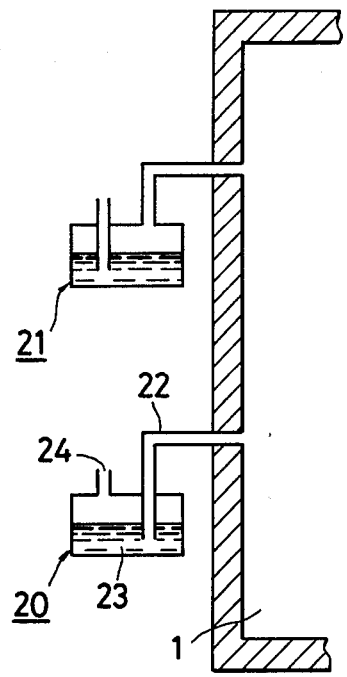
FIG. 4 is also an explanatory diagram showing one example of a device adapted to control the pressure in the food storage chamber.

The excessive pressure control valve 18 and the negative pressure control valve 12 may be replaced by those 20 and 21 shown in FIG. 4, respectively. Since these devices 20 and 21 are theoretically equal, only the device 20 will be described. In the case where the pressure in the storage chamber 1 is equal to the atmospheric pressure, the gases outside and inside the storage chamber 1 are separated from each other by a liquid 23 such as propylene glycol whose vapor pressure is lower than water. Only when the gas pressure in the storage chamber 1 becomes higher than the atmospheric pressure, the gas in the storage chamber 1 is allowed to flow, in the form of bubbles, into the liquid 23 through a pipe 22 which is immersed in the liquid 23 at a predetermined depth so that a predetermined pressure head is maintained, as a result of which the gas in the chamber is purged. Controlling the pressure head will control the pressures at which devices 20 and 21 operate.

Instead of the use of an air pump the following method may be also effectively employed if the oxygen concentration to be controlled can be relatively high.

An opening section which has a predetermined opening area and through which gases outside and inside the storage chamber can flow mutually is provided at a part of the wall of the storage chamber 1 or the electrolytic cell accommodating chamber 13. Then, by suitably establishing the relationships of the internal volume of the storage chamber, the opening area of the opening section, and the oxygen removing rate by the electrolytic cell, a certain balance is provided between the amount of oxygen as a part of air entering the storage chamber from the outside and the amount of oxygen removed from the storage chamber, as a result of which the oxygen concentration in the storage chamber is maintained constant.

For instance, in the case where the opening area is relatively large and a large amount of air is allowed to enter the storage chamber, the oxygen concentration is maintained constant at a relatively high value. In contrast, where the opening area is relatively small, the oxygen concentration is maintained relatively low.

In this method, the provision of the air pump 17 for supplying air, the solenoid valve 16 and the controller for controlling them is unnecessary and, furthermore, the provision of the excessive pressure control valve 18 and the negative pressure control valve 12 is unnecessary. Accordingly, the whole system can be simplified very much.

This leads to the significant advantage that, even if the storage chamber is not as extremely gastight as the conventional CA storage chamber, the desired oxygen concentration can be achieved.

Now, concrete examples of the apparatus according to this invention will be described.

EXAMPLE 1

The gas diffusion electrode was manufactured in accordance with the following process:

100 parts of active carbon powder having a particle size less than 200 mesh and carrying silver as catalyst was mixed with 100 parts of polytetrafluoroethylene suspension (30% as solid component). The mixture thus formed was sprayed onto one surface of a porous nickel sheet 1 mm thick having a porosity of 80% to form a catalyst layer. Then, the sheet thus treated was dried at 100° C. for three hours. Next, a porous polytetrafluoroethylene sheet 0.1 mm thick and having a porosity of 35% was bonded under a pressure of 250 kg/cm² on the catalyst layer. Finally, the sheet assembly was subjected to heat treatment at 280° C. in a nitrogen atmosphere. Thus, the gas diffusion electrode capable of reducing the oxygen in a gas mixture including oxygen was provided.

Figure 5:
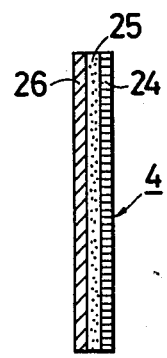
FIG. 5 is a sectional view showing one example of a gas diffusion electrode.

The gas diffusion electrode as shown in FIG. 5 comprised three layers: a porous nickel layer 24, a catalyst layer 25, and a porous polytetrafluoroethylene layer 26. The electrode thus formed permitted gas to diffuse, but did not permit electrolyte to leak. Furthermore, a gas mixture containing oxygen was allowed to be in contact with the porous polytetrafluoroethylene layer 26, while electrolyte was allowed to be in contact with the porous nickel layer 24.

Figure 6:
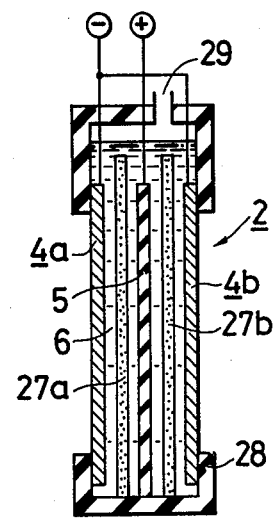
FIG. 6 is also a sectional view showing one example of a unitary electrolytic cell.

The unitary electrolytic cell 2 in the electrochemical oxygen removal apparatus, as shown in FIG. 6, comprised two gas diffusion electrodes 4a and 4b as described above, an electrolyte 6 of 30% KOH, separators 27a and 27b, a plastic cell 28, and an oxygen outlet 29.

Figure 7:
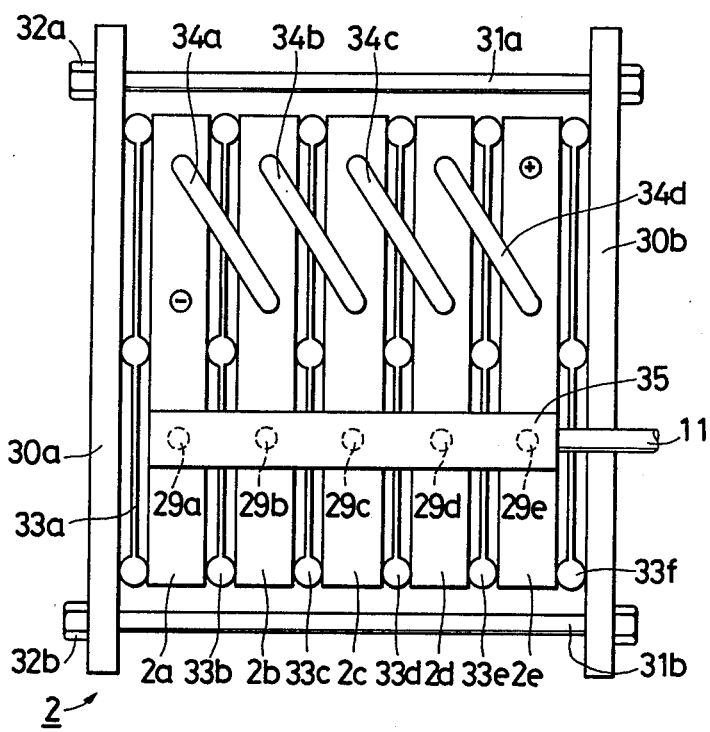
FIG. 7 is a plan view illustrating one example of an electrolytic cell assembly obtained by stacking the unitary electrolytic cells shown in FIG. 6.

Shown in FIG. 7 is an assembly obtained by stacking the above-described unitary electrolytic cells.

A plurality of unitary electrolytic cells 2a, 2b, 2c, 2d and 2e were placed between side boards 30a and 30b which were tightened with bolts 31a and 31b, and nuts 32a and 32b, thereby forming an assembly. Spacers 33a through 33f were interposed between adjacent unitary electrolytic cells, respectively, to form gas passages.

The unitary electrolytic cells were electrically series-connected with connecting bars 34a, 34b, 34c and 34d. The oxygen gas flowing out of the oxygen outlets 29a through 29e of the unitary electrolytic cells was collected in an oxygen collecting chamber 35 once and was then purged outside the system through an oxygen purging outlet 11 provided for the assembly.

With the electrolytic cell assembly 2 shown in FIG. 7 accommodated in the electrolytic cell accommodating chamber 13 the gas in the storage chamber was brought into contact with the gas diffusion electrodes of the unitary electrolytic cells while moving upwardly from the bottom of the electrolytic cell assembly via slits between adjacent cells.

The apparent working area of the gas diffusion electrode of each cell was 1 m².

Two electrolytic cell assemblies described above were provided for a storage chamber having an integral volume of 20 m³, the wall of which was obtained by foaming polyurethane between two aluminum plates.

A temperature and humidity control device was provided for the storage chamber, which was capable of controlling temperature in a range of −10° C. to +30° C. with a precision of ±1° C. and controlling humidity in a range of 50 to 95%.

Relief valves for controlling the excessive pressure and negative pressure in the storage chamber were such that the operating pressure was 10mm in a water column.

A bellows made of a thin polyethylene sheet and capable of expanding and contracting under a pressure below 10 mm in a water column was employed as the pressure compensating device for preventing the gas from entering and purging out of the storage chamber. The internal volume of the bellows obtained when the bellows was fully expanded was 147 l. By the use of this pressure compensating device, no substitution of the gases inside and outside the storage chamber was caused even if the temperature in the storage chamber was changed in a range of ±1° C.

The electrolytic cell was operated while the temperature and humidity in the storage chamber were kept at 0° C. and 90% respectively, as a result of which the oxygen concentration in the storage chamber was reduced to 0% in 12 hours.

Figure 8:
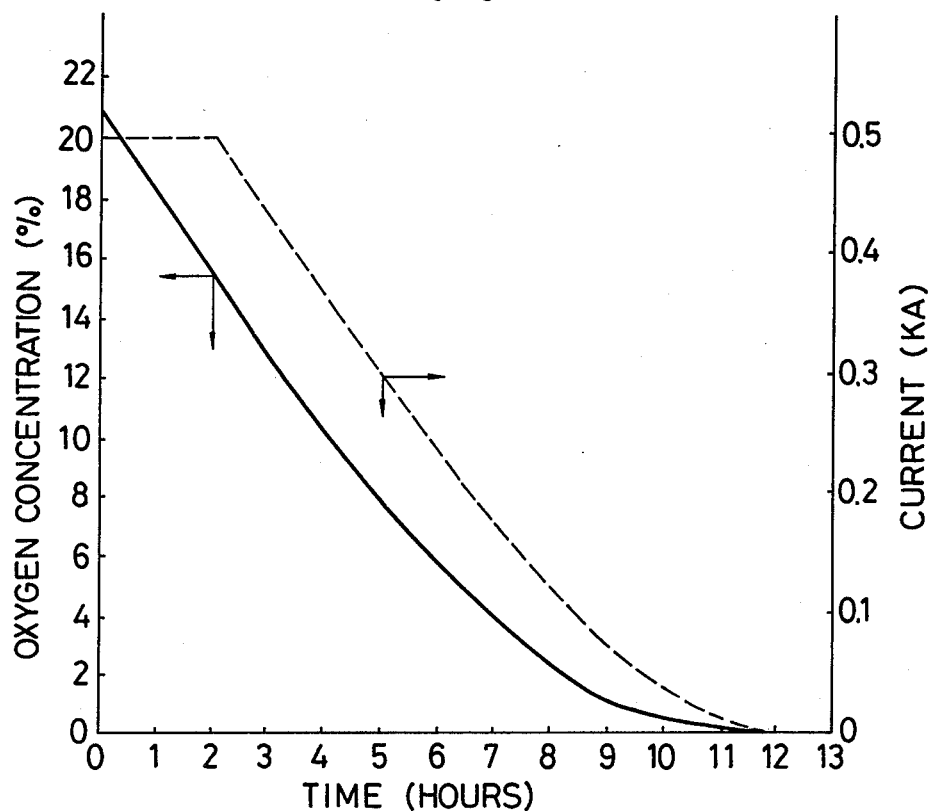
FIG. 8 is a graphical representation indicating one example of the variation with time of the value of current which flows through the electolytic cell and the oxygen concentration in the storage chamber.

The variations with time of the current flowing through each electrolytic cell and of the oxygen concentration in the storage chamber were as indicated in FIG. 8. During the initial 2 hours a constant current of 0.5 KA flowed, and thereafter a constant voltage of 12 V was applied while the current was gradually decreased. The quantity of electricity used by all cells until the oxygen concentration in the storage chamber was reduced to 0% was 25.30 KAh.

The total spacial volume of the storage chamber, the electrolytic cell accommodating chamber, and the ducts connecting the electrolytic cell accommodating chamber was 20.5 m³, while the amount of air introduced through the negative pressure control valve in order to compensate for the negative pressure in the storage chamber which was caused by removing the oxygen gas was 5.0 m³. Accordingly, the total air of 25.5 m³ determined the quantity of electricity used for removing the oxygen gas. The theoretical quantity of electricity required for removing oxygen from the amount of air is 25.26 KAh. Thus, the abovedescribed practical value was well coincident with the theoretical value.

On the other hand, after the oxygen concentration was reduced to 0%, the storage chamber was left as it was without operating the oxygen removing device for five days, as a result of which the oxygen concentration therein was increased to 1%. It is considered that this increment was due to a draft flowing into the storage chamber. However, the oxygen concentration was restored to 0% again by supplying current as much as 255 Ah to the electrolytic cell on the fifth day. Thereafter by applying current as much as 255 Ah to the electrolytic cell every five days, the oxygen concentration in the storage chamber was maintained in the range of 0% to 1% for six months.

EXAMPLE 2

Apples were placed in the storage chamber described with reference to Example 1 until the volume occupied by the apples reached 50% of the internal volume of the storage chamber. The oxygen concentration in the storage chamber was depleted to 3% by operating the electrolytic cell for five hours. The temperature and humidity of the storage chamber were set to 0° C. and 95%, respectively.

An oxygen concentration sensor consisting of a Pb-$O_2$ cell was provided for the storage chamber, and the oxygen concentration was maintained at 3% by means of the controller. As a result, only a slight amount of current, 0.5 KAh per 20 days, was automatically allowed to flow in the electrolytic cell, and the air pump connected to the controller was automatically operated once per 20 days to supply fresh air into the storage chamber.

After 7 months, the apples were taken out of the storage chamber, but they were found fine in quality. On the other hand, the quality of apples stored without controlling the oxygen concentration was found considerably poor in three months.

EXAMPLE 3

Various foods were experimentally stored in accordance with the storage method described in Example 2 above, and the resultant data are as indicated below:

| Food | Temp. (°C.) | Relative humidity (%) | Oxygen concentration (%) | Effective storage period Oxygen concentration controlled (weeks) | Oxygen concentration not controlled (weeks) |
| --- | --- | --- | --- | --- | --- |
| Pears | 0 | 90 | 5 | 24 | 12 |
| Chestnuts | 0 | 80 | 2 | 30 | 20 |
| Garlics | 0 | 85 | 2 | 50 | 16 |
| Tomatoes | 10 | 95 | 5 | 6 | 3 |
| Potatoes | 3 | 85 | 4 | 33 | 16 |

EXAMPLE 4

Ten holes, 10 mm in diameter, were formed in the wall of the electrolytic cell accommodating chamber. The holes were provided with covers, so that the holes could be appropriately covered. In this Example 4, none of the excessive pressure control valve, the negative pressure valve, and the air pump for introducing the air were provided. The oxygen removing device was operated while the number of holes opened was varied. Th following relationships between the stable oxygen concentration and the number of holes opened were found.

| Number of holes | Stable Oxygen Concentration (%) |
| --- | --- |
| 1 | 1.0 |
| 3 | 2.8 |
| 5 | 5.4 |
| 10 | 10.5 |

The key points required when the electrochemical oxygen removal apparatus is applied to the storage chamber for foods have been described above. However, it should be noted that the invention is not limited thereto or thereby, and the method according to the invention can be employed in combination with all the methods employed in the conventional CA storage.

For instance, a method has been utilized in the field of CA storage, in which a tent made of plastic sheet which can expand and contract freely and is excellent in gastightness is provided in a storage chamber which is poor in gastightness and foods are stored in the tent. Application of the invention to this method can be accomplished by connecting the electrochemical oxygen removal apparatus through pipes with the tent. Furthermore, various devices such as for instance a carbon dioxide scrubber provided for the conventional CA storage may be provided for the storage chamber according to the invention, for the purpose of controlling the concentration of the carbon dioxide gas in the storage chamber. In addition a method of connecting a nitrogen cylinder to the end of the negative pressure control valve in order to compensate the negative pressure has been employed. If this method is applied to this invention, the oxygen can be more quickly removed.

What is claimed is:

1. A method of storing foods in a storage chamber comprising:
   applying a D.C. voltage to an electrolytic cell in order to remove oxygen from the atmosphere in said storage chamber, said cell comprising an electrolyte, an oxygen generating anode, and a gas diffusion cathode in contact with the atmosphere in said storage chamber and capable of selectively subjecting oxygen in the atmosphere to electrolytic reduction at the cathode without substantially generating hydrogen; and
   introducing air into said storage chamber in order to control the oxygen concentration in said storage chamber to a desired value less than the oxygen concentration in said air.

2. A method as claimed i claim 1, further comprising:
   sensing the oxygen concentration in said storage chamber and automatically controlling at least one of the rate of oxygen removal and rate of air introduction in response to the sensed concentration.

3. A method as claimed in claim 1, wherein said removing step comprises:
   applying to said electrolytic cell a predetermined constant current when the current of said electrolytic cell corresponding to a predetermined voltage, said predetermined voltage not exceeding the voltage at which hydrogen generation would occur, exceeds said predetermined current, and applying a constant voltage, not exceeding the voltage at which hydrogen generation would occur, when the voltage of said electrolytic cell corresponding to said predetermined current exceeds said predetermined voltage.

4. A method as claimed in claim 1, in which said electrolytic cell is arranged in an electrolytic cell accommodating chamber, and in which said introducing step is accomplished by allowing air to enter into said accommodating chamber by natural diffusion through an opening formed in a wall of said electrolytic cell accommodating chamber and controlling the size of said opening to establish a balance between an air entering rate and an oxygen removing rate.

5. A method according to claim 1, further comprising:
   sensing the hydrogen content of gas emitted from said electrolytic cell and interrupting said D.C. voltage when hydrogen is detected.

6. A method as claimed in claim 1, further comprising:
   sensing the level of said D.C. voltage and interrupting said voltage when a D.C. Voltage corresponding to a predetermined oxygen content of the atmosphere contacting the cathode has been exceeded has been exceeded.

* * * * *